US012705071B2

(12) United States Patent
Wang et al.

(10) Patent No.: US 12,705,071 B2
(45) Date of Patent: Aug. 11, 2026

(54) USER INTERFACE DISPLAY METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Shun Wang, Dongguan (CN); Deyin Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 362 days.

(21) Appl. No.: 18/377,538

(22) Filed: Oct. 6, 2023

(65) Prior Publication Data

US 2024/0045702 A1 Feb. 8, 2024

Related U.S. Application Data

(63) Continuation of application No. PCT/CN2022/078423, filed on Feb. 28, 2022.

(30) Foreign Application Priority Data

Apr. 6, 2021 (CN) ........................ 202110367131.3

(51) Int. Cl.
*G06F 9/451* (2018.01)
*G06F 1/16* (2006.01)
(Continued)

(52) U.S. Cl.
CPC .............. *G06F 9/451* (2018.02); *G06F 1/163* (2013.01); *G06F 3/0485* (2013.01);
(Continued)

(58) Field of Classification Search
CPC ..... G06T 13/80; G06F 3/0485; G06F 3/0488; G06F 1/163; G06F 9/451; G06F 9/54
See application file for complete search history.

(56) References Cited

U.S. PATENT DOCUMENTS 10,496,572 B1 * 12/2019 Kelm ...................... G06F 1/329
2006/0113379 A1 * 6/2006 Cricco .................. H04W 8/245
235/380

(Continued)

FOREIGN PATENT DOCUMENTS

CN 103064645 A 4/2013
CN 103544059 A 1/2014

(Continued)

OTHER PUBLICATIONS

Extended European Search Report dated Sep. 13, 2024 received in European Patent Application No. EP22783813.3.

(Continued)

*Primary Examiner* — Tadesse Hailu
(74) *Attorney, Agent, or Firm* — Sheppard, Mullin, Richter & Hampton LLP

(57) ABSTRACT

The present disclosure relates to wearable devices field, and provides a user interface display method and apparatus, a device, and a storage medium. The method includes: displaying (301), by a first system when a first system is in an awake state and a second system is in a sleep state, a first user interface; drawing and displaying (302), by the first system, a second user interface in response to a system switching instruction, the second user interface being a user interface of the second system; and displaying (303), by the second system, the second user interface in response to completion of drawing of the second user interface by the second system. Displaying the second user interface by the first system can improve the start-up speed of system (Continued)

switching visually, and reduce the display delay for the second system to display the second user interface in the system switching process.

17 Claims, 5 Drawing Sheets

(51) Int. Cl.
*G06F 3/0485* (2022.01)
*G06F 3/0488* (2022.01)
*G06F 9/54* (2006.01)
*G06T 13/80* (2011.01)

(52) U.S. Cl.
CPC .............. *G06F 3/0488* (2013.01); *G06F 9/54* (2013.01); *G06T 13/80* (2013.01)

(56) References Cited

U.S. PATENT DOCUMENTS

2007/0061556 A1 3/2007 Rothman et al.
2008/0189538 A1* 8/2008 King ..................... G06F 9/4418 713/1
2011/0066888 A1 3/2011 Lai
2012/0158814 A1* 6/2012 Sabiwalsky ............... G06F 9/54 709/201
2012/0166837 A1* 6/2012 Henry ................... G06F 1/3203 713/321
2012/0246370 A1* 9/2012 Zhang ................... G06F 9/4812 710/267
2013/0219086 A1* 8/2013 Hu ...................... G06F 13/1668 710/14
2016/0055031 A1* 2/2016 Tu ........................... G06F 9/441 718/108
2017/0177063 A1* 6/2017 Ederbach .............. G06F 1/3231
2017/0199622 A1* 7/2017 Lee ....................... G06F 3/0482
2017/0212793 A1* 7/2017 Choi ....................... G06F 9/441
2019/0237003 A1 8/2019 Cao et al.
2021/0169417 A1* 6/2021 Burton ................. A61B 5/4857
2023/0161397 A1* 5/2023 Zhou ..................... G06F 1/3278 713/323

FOREIGN PATENT DOCUMENTS

CN 103782272 A 5/2014
CN 105204931 A 12/2015
CN 105872711 A 8/2016
CN 106843798 A 6/2017
CN 107908447 A 4/2018
CN 108334296 A 7/2018
CN 109426525 A 3/2019
CN 111045589 A 4/2020
EP 3660672 A1 6/2020

OTHER PUBLICATIONS

Chinese First Office Action, Chinese Application No. 202110367131.3, mailed May 15, 2025 (23 pages).
International Search Report and Written Opinion dated Apr. 28, 2022 in International Application No. PCT/CN2022/078423. English translation attached.
Chinese Second Office Action, Chinese Application No. 202110367131.3, mailed Nov. 19, 2025 (22 pages).

* cited by examiner

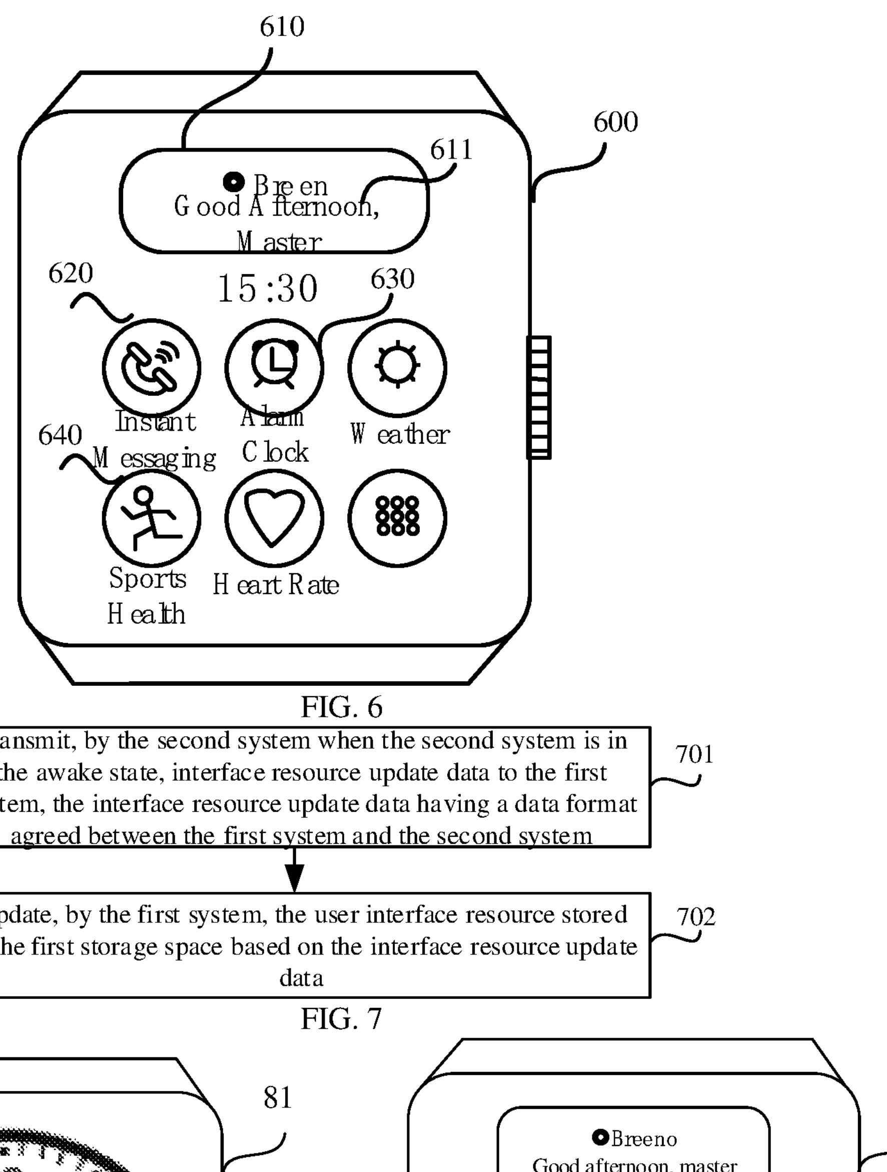
FIG. 6
FIG. 7
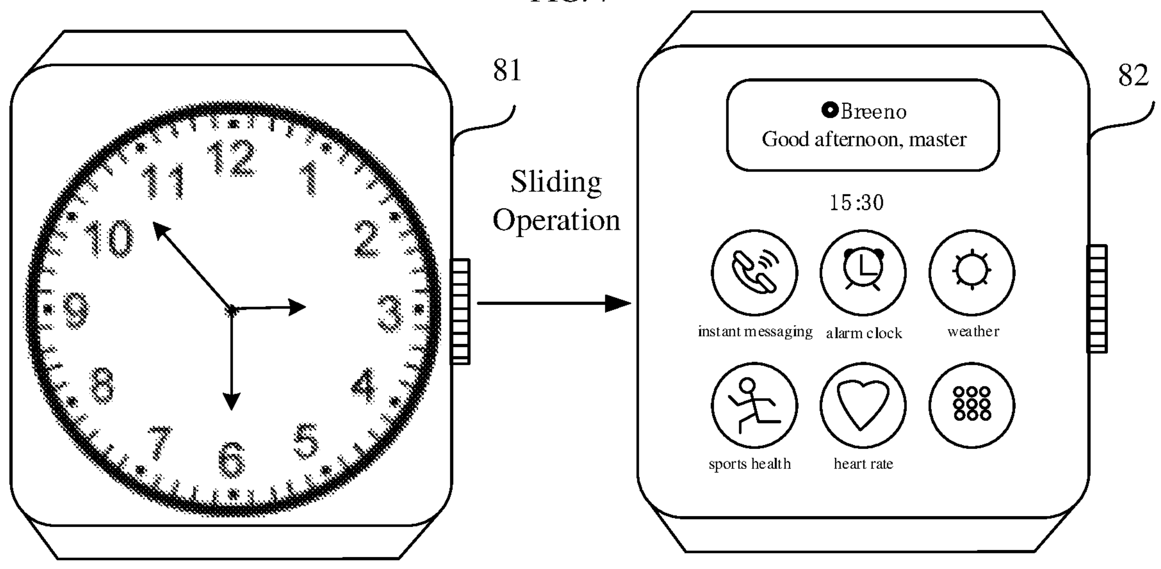
FIG. 8

First System Module 1001

Second System Module 1002

Memory 1120

Display Component 1140

First Processor 1111

Second Processor 1112

1110

Communication Component 1130

USER INTERFACE DISPLAY METHOD AND APPARATUS, DEVICE, AND STORAGE MEDIUM

CROSS-REFERENCE TO RELATED APPLICATIONS

The present application is a continuation of International Application No. PCT/CN2022/078423 filed on Feb. 28, 2022, which claims priority to Chinese Patent Application No. 202110367131.3, titled "USER INTERFACE DISPLAY METHOD AND APPARATUS, DEVICE, AND STORAGE MEDIUM" and filed on Apr. 6, 2021, which is incorporated herein by reference in its entirety.

TECHNICAL FIELD

The present disclosure relates to the field of wearable devices, and more particularly, to a user interface display method and apparatus, a device, and a storage medium.

BACKGROUND

A wearable device is a portable electronic device that can be worn directly or integrated into clothes or accessories. Common wearable devices include smart watches, smart bracelets, smart glasses, and so on.

Taking a smart watch as an example of wearable device, a user can use the wearable device to check the time, and use applications installed in the wearable device for functions such as sleep quality monitoring, exercise statistics, and notification message viewing.

SUMMARY

The embodiments of the present disclosure provide a user interface display method and apparatus, a device, and a storage medium. The technical solutions will be described as follows.

In an aspect, an embodiment of the present disclosure provides a user interface display method. The method is applied in a wearable device that supports running of a first system and a second system. The method includes: displaying, by the first system when the first system is in an awake state and the second system is in a sleep state, a first user interface; drawing and displaying, by the first system, a second user interface in response to a system switching instruction, the second user interface being a user interface of the second system; and displaying, by the second system, the second user interface in response to completion of drawing of the second user interface by the second system.

In another aspect, an embodiment of the present disclosure provides a user interface display apparatus. The apparatus is applied in a wearable device that supports running of a first system and a second system. The apparatus includes: a first system module configured to display, by the first system when the first system is in an awake state and the second system is in a sleep state, a first user interface; the first system module being further configured to draw and display, by the first system, a second user interface in response to a system switching instruction, the second user interface being a user interface of the second system; and a second system module configured to display, by the second system, the second user interface in response to completion of drawing of the second user interface by the second system.

In another aspect, an embodiment of the present disclosure provides a wearable device. The wearable device includes a processor and a memory. The memory stores at least one instruction which, when executed by the processor, implements the user interface display method according to the above aspect.

In another aspect, an embodiment of the present disclosure provides a computer-readable storage medium. The computer-readable storage medium stores at least one instruction which, when executed by a processor, implements the user interface display method according to the above aspect.

In another aspect, an embodiment of the present disclosure provides a computer program product or computer program. The computer program product or computer program includes computer instructions stored in a computer-readable storage medium. The computer instructions, when read from the computer-readable storage medium and executed by a processor, implement the user interface display method according to the above aspect.

BRIEF DESCRIPTION OF DRAWINGS

FIG. 6 is a schematic diagram showing a second user interface in a smart watch according to an exemplary embodiment of the present disclosure;

FIG. 7 shows a flowchart illustrating a user interface resource update process according to an exemplary embodiment of the present disclosure;

FIG. 8 is a schematic diagram showing user interfaces in a system switching process of a smart watch according to an exemplary embodiment of the present disclosure;

DESCRIPTION OF EMBODIMENTS

Figure 1:
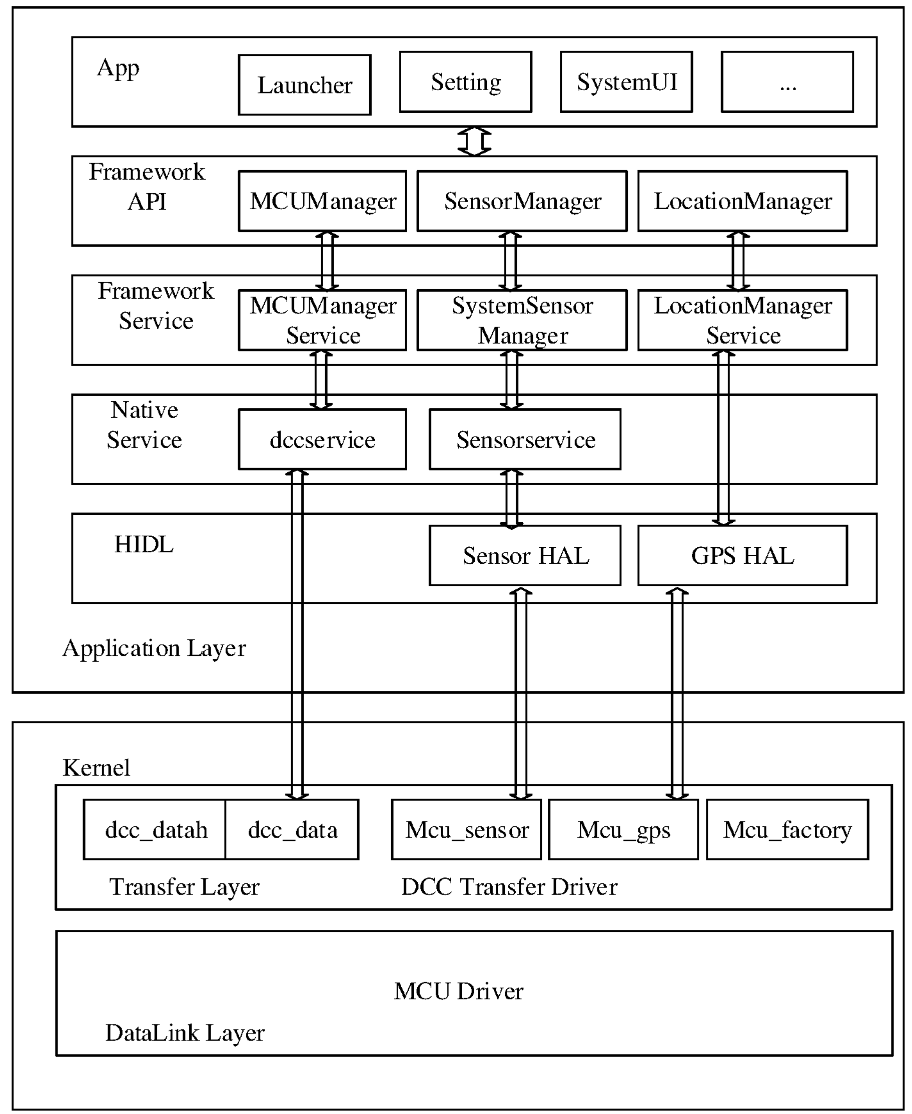
FIG. 1 is a schematic diagram showing a dual-core communication software framework corresponding to a second processor according to an exemplary embodiment of the present disclosure.

The embodiments of the present disclosure will be further described in detail below with reference to the accompanying drawings, such that the objects, technical solutions, and advantages of the present disclosure will become more apparent.

The term "plurality" as used herein means two or more. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In the related art, a wearable device is equipped with a single processor, and with an operating system running on the processor, all system events generated during the operation of the device are processed. Thus, the processor needs to have strong data processing capabilities, and maintain working state during the operation of the device. However, in daily use, a wearable device only needs to implement some functions having relatively low requirements on processing performance in most cases. For example, for a smart watch or a smart bracelet, in most cases, it only needs to display time and prompt messages. Therefore, keeping the processor in the working state for a long time will not improve the performance of the wearable device, but will increase the power consumption of the device, resulting in a shorter battery life of the wearable device.

In order to reduce the power consumption of the wearable device while ensuring the performance of the wearable device, in a possible implementation, the wearable device is at least provided with a first processor and a second processor with different processing performance and power consumption and configured to run a first system and a second system, respectively (i.e., dual-core dual-system), and a system switching mechanism is designed for such dual-core dual-system.

During the operation of the wearable device, the first system running on the processor with lower power consumption processes events with low performance processing requirements, and the processor with higher power consumption is kept in a sleep state (correspondingly, the second system running on the processor with higher power consumption is in a sleep state), such that the power consumption of the wearable device can be reduced while implementing the basic functions of the wearable device. When there is an event requiring high processing performance (e.g., when initiating an application), the processor with higher power consumption is waken for switching to the second system to process the event, so as to ensure that the triggered event can be responded to and processed in time to meet the performance requirements of the wearable device.

Moreover, since it takes a certain amount of time (at least 200 ms to 300 ms) for the processor with higher power consumption to switch from the sleep state to the awake state, in order to reduce the display delay of system pictures during the system switching process, the present disclosure introduces a system switching effect pre-display mechanism. When the processor with higher power consumption is woken for switching, the first system running on the processor with lower power consumption can draw and display a second user interface. After the processor with higher power consumption draws the second user interface, the second system running on the processor with higher power consumption gets the permission for user interface display to achieve the pre-display in the system switching, thereby improving the start-up speed of the system switching visually and reducing the display delay of the user interface during the system switching process.

In an embodiment of the present disclosure, since the first processor and the second processor work asynchronously, and the first system and the second system need to implement system communication (or dual-core communication). In a possible application scenario, the first system is a Real Time Operating System (RTOS) running on a Micro Controller Unit (MCU), and the second system is an Android operating system running on a Central Processing Unit (CPU).

FIG. 1 shows a dual-core communication software framework of an Android operating system according to an exemplary embodiment of the present disclosure. The dual-core communication software framework follows the design principles of "low coupling, high reliability, and high reuse", and includes development of Kernel, Hardware Abstraction Layer Interface Description Language (HIDL), Native Service, Framework Service, Framework API, and APP modules.

Here, the APP modules include functional modules such as Launcher, Setting and SystemUI (System User Interface). The Framework API modules include management modules such as MCUManager (MCU management), SensorManager (sensor management), LocationManager (location management), etc. The Framework Service modules include service modules such as MCUManagerService (MCU management service), SystemSensorManager (system sensor management), LocationManagerService (location management service), etc. The Native Service modules include service modules such as dccservice (dcc service), Sensorservice (sensor service), etc. The HIDL modules include modules such as Sensor Hardware Abstraction Layer (Sensor HAL), Global Positioning System Hardware Abstraction Layer (GPS HAL), etc. The Kernel modules include DCC Transfer Drivers such as dcc_datah, dcc_data, Mcu_sensor, Mcu_gps, and Mcu_factory.

As an interface layer connecting the upper and lower layers in the dual-core communication software framework, the transport layer hides transmission details of communication in the lower layer (data link layer) of the system from the application layer, and provides service channels for application scenarios. The application layer, as the entity for service provision, responds to human-machine interaction and transmits data generated in the process of human-machine interaction via the transport layer, and respond to external data requests.

Figure 2:
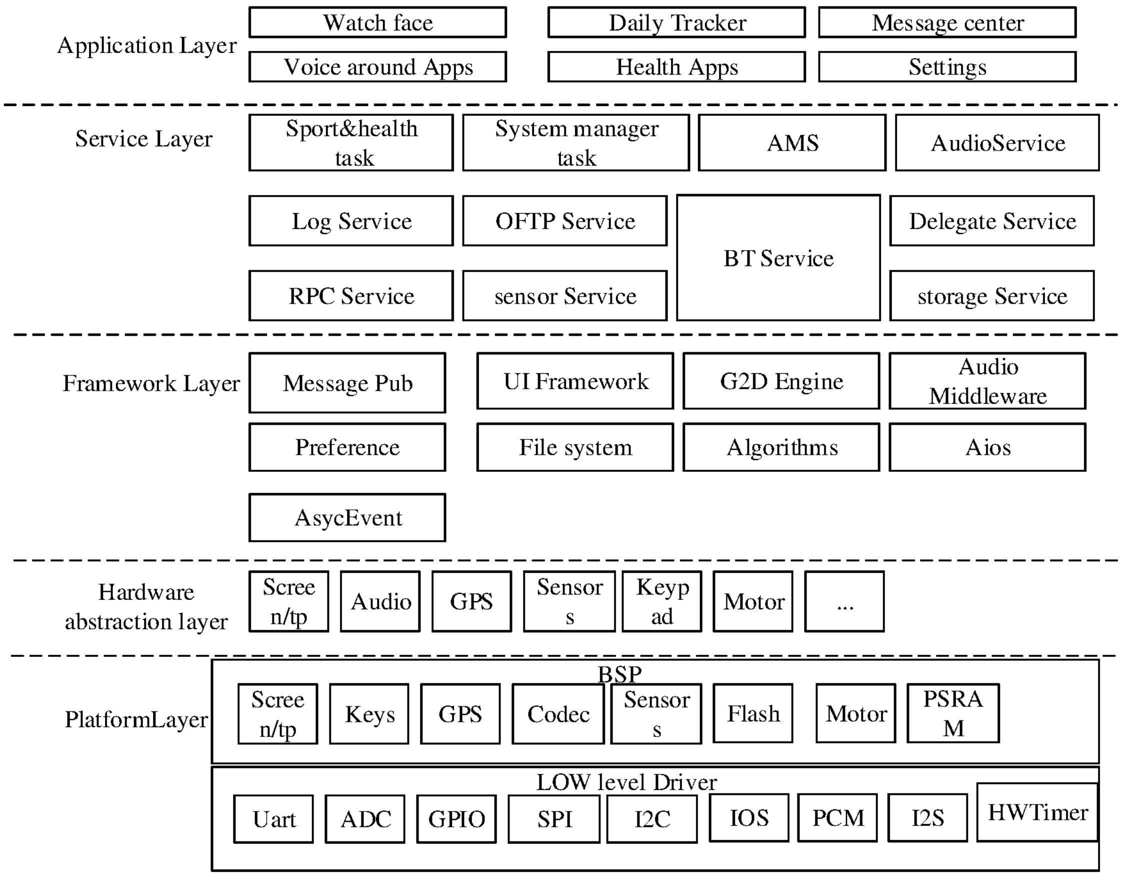
FIG. 2 is a schematic diagram showing a dual-core communication software framework corresponding to a first processor according to an exemplary embodiment of the present disclosure.

The RTOS is designed using the principle of reciprocity. Taking a smart watch as an example of a wearable device, as shown in FIG. 2, it shows a dual-core communication software framework of an RTOS according to an exemplary embodiment of the present disclosure.

The dual-core communication software framework of the RTOS is divided into Application Layer, Service Layer, Framework Layer, Hardware Abstraction Layer, and Platform Layer.

Here, the application layer includes application modules such as watch face, Daily Tracker, Message Center, Voice around Apps, Health Apps, Settings, etc. The service layer includes service modules such as Sport&health task, System manager task, Activity Management Service (AMS), AudioService (audio service), Log Service (log service), Odette File Transfer Protocol Service (OFTP Service), Bluetooth service (BT Service), Delegate Service, remote call service (RPC Service), sensor service, storage service, etc. The framework layer includes framework modules such as Message Pub, User interface framework (UI Framework), G2D Engine, Audio Middleware, Preference, File system, Algorithms, Aios, AsycEvent (in-process asynchronous event), etc. The hardware abstraction layer includes hardware abstraction modules such as Screen/TP (screen/touch screen), Audio, Global Positioning System (GPS), sensors, Keypad, Motor, etc. The platform layer includes Board Support Package (BSP) and LOW level Driver, and the BSP includes Screen/TP, Keys, GPS, Codec, sensors, Flash, Motor, Pseudo-Static Random Access Memory (PSRAM), etc., and the LOW level Driver includes Universal Asynchronous Transceiver Transmitter (Uart), Analog-to-Digital Converter (ADC), General-Purpose Input and Output (GPIO), Serial Peripheral Interface (SPI), Integrated Circuit Bus (I2C), Input Output System (IOS), Pulse Coding Modulation (PCM), Integrated Audio Bus (I2S), HWTimer (Hardware Timer), etc.

It should be noted that the above dual-core communication software framework is for illustration only, and those skilled in the art can add, delete or modify the above framework according to actual needs. The embodiment of the present disclosure is not limited to any specific structural composition of the dual-core communication software framework.

The user interface display method according to an embodiment of the present disclosure includes:

the user interface display method being applied in a wearable device that supports running of a first system and a second system;

displaying, by the first system when the first system is in an awake state and the second system is in a sleep state, a first user interface;

drawing and displaying, by the first system, a second user interface in response to a system switching instruction, the second user interface being a user interface of the second system; and displaying, by the second system, the second user interface in response to completion of drawing of the second user interface by the second system.

In some embodiments, the operation of drawing and displaying, by the first system, the second user interface in response to the system switching instruction may include:

obtaining, by the first system in response to the system switching instruction, a user interface resource corresponding to the second user interface from a first storage space, the first storage space being a storage space corresponding to the first system;

drawing, by the first system, the second user interface based on the user interface resource; and displaying, by the first system, the second user interface.

In some embodiments, the user interface resource may include an interface element resource and display position information corresponding to an interface element, and the operation of drawing, by the first system, the second user interface based on the user interface resource may include:

drawing the interface element based on the interface element resource; and displaying the interface element at an interface element position indicated by the display position information to obtain the second user interface.

In some embodiments, the operation of drawing the interface element based on the interface element resource may include:

determining, in response to a variable interface element being included in the interface element, a target interface element resource corresponding to the variable interface element based on current time, the variable interface element corresponding to at least two types of interface element resources, each corresponding to a different display period; and drawing the variable interface element based on the target interface element resource.

In some embodiments, the system switching instruction may be triggered by a sliding operation, and the operation of displaying, by the first system, the second user interface may include:

displaying, by the first system, a switching animation of switching from the first user interface to the second user interface based on a sliding direction of the sliding operation, and the operation of displaying, by the second system, the second user interface in response to completion of drawing of the second user interface by the second system may include:

displaying, by the second system, the second user interface in response to completion of drawing of the second user interface by the second system and an end of the sliding operation.

In some embodiments, the method may further include:

transmitting, by the second system when the second system is in the awake state, interface resource update data to the first system, the interface resource update data having a data format agreed between the first system and the second system; or transmitting, by the second system, interface resource update data to the first system after the second system restarts; and updating, by the first system, the user interface resource stored in the first storage space based on the interface resource update data.

In some embodiments, the operation of transmitting, by the second system when the second system is in the awake state, the interface resource update data to the first system may include:

transmitting, by the second system when the second system is in the awake state, the interface resource update data to the first system in response to an interface resource change event, the interface resource change event comprising at least one of an interface element addition or deletion event, an interface element position adjustment event, or a system setting change event.

In some embodiments, the operation of displaying, by the second system, the second user interface may include:

transmitting, by the second system, a switching instruction to the first system, the switching instruction being used to instruct the first system to transfer a permission for graphical user interface display; and displaying, by the second system, the second user interface in response to the second system obtaining the permission for graphical user interface display.

In some embodiments, the wearable device may be provided with a first processor and a second processor, the second processor having higher power consumption than the first processor, the first system being a system run by the first processor, and the second system being a system run by the second processor.

Figure 3:
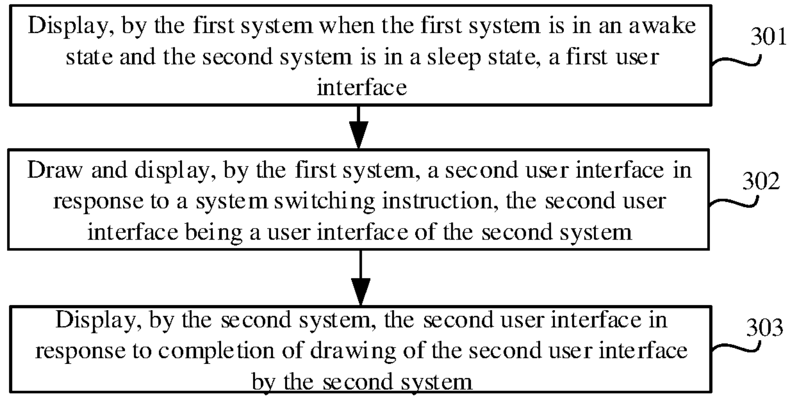
FIG. 3 shows a flowchart illustrating a user interface display method according to an exemplary embodiment of the present disclosure.

Reference is now made to FIG. 3, which is a flowchart illustrating a user interface display method for a user interface according to an exemplary embodiment of the present disclosure. This embodiment will be explained with reference to an example where this method is applied to a wearable device that supports running of a first system and a second system. The method may include the following steps.

At Step 301, when the first system is in an awake state and the second system is in a sleep state, a first user interface is displayed by the first system.

In a possible implementation, the wearable device is provided with a first processor and a second processor. The processing performance of the first processor is lower than that of the second processor (the processing capacity and processing speed of the first processor are lower than those of the second processor), and the power consumption of the first processor is lower than that of the second processor. Correspondingly, the second system (run by the second processor) can process events processed by the first system (run by the first processor), but the first system may not necessarily be able to process events processed by the second system.

In another possible implementation, the wearable device may be equipped with a single processor, and the first system and the second system may run on different cores of the processor, respectively. Here, the core running the second system has higher processing performance than the core running the first system.

For example, taking a smart watch as an example of the wearable device, the first processor is an MCU, the second processor is a CPU, the first system is an RTOS, and the second system is an Android system. Correspondingly, the events that the first system is able to process include scenarios requiring low processing performance or weak interaction scenarios such as watch face display, watch face interface switching, notification message display, etc. The events that the second system is able to process include scenarios requiring high processing performance or strong interaction scenarios such as incoming call answering, launching applications, watch face editing, function setting, etc.

In a possible implementation, the working modes of the wearable device include a performance mode, a hybrid mode, and a low power consumption mode. Here, in the performance mode, both the second processor and the first processor remain awake (accordingly, both the first system and the second system are in the awake state). In the low power consumption mode, only the first processor remains awake (normal working state), while the second processor remains off (that is, the first system is in the awake state, the second system is in an off state). In the hybrid mode, when the first system processes events, the second processor remains in the sleep state, and the second processor is in a standby state and can be switched between the sleep and awake states (that is, when the first system is in the awake state, the second system can be in the awake state or in the sleep state).

In some embodiments, in the awake state, system-related data is cached in a memory (RAM), such that the system-related data can be run at any time. In the sleep state, most hardware modules of the processor are turned off, and system-related data is stored in a hard disk (ROM) and written into the memory from the hard disk when switched to the awake state.

Unlike electronic devices with strong interaction attributes such as smartphones, the wearable device, as an auxiliary electronic device, only has weak interaction with users in most usage scenarios. For example, the user only lifts his/her wrist to check the time on the smart watch in most scenarios. Therefore, when the wearable device processes an event using the first system, the second processor is controlled to be in the sleep state (the second system is in the sleep state), thereby reducing the overall power consumption of the wearable device.

At Step 302, a second user interface is drawn and displayed by the first system in response to a system switching instruction. The second user interface is a user interface of the second system.

Here, the system switching instruction is used to instruct switching of the system running in the foreground, that is, it is needed to switch the system running in the foreground from the first system to the second system, rather than simply switching the second system in the sleep state to be in the awake state. Correspondingly, the permission of graphical user interface display of the wearable device will be switched from the first system to the second system.

In some possible application scenarios, when the user needs to use a function that is not available in the first user interface displayed by the first system, the user needs to switch the first system to the second system, and selects the desired function from the second user interface displayed by the second system.

In the case where the first system is in the awake state (the interface of the wearable device is the first user interface displayed by the first system) and the second system is in the sleep state, when a system switching instruction is received, it indicates that the first system needs to be switched to the second system. Since the first system does not have the function and ability to process the corresponding event, it is necessary to wake the second system in the sleep state, so as to process using the second system.

However, because the process of waking the second system and displaying using the second system takes a certain amount of time (at least 200 ms to 300 ms), there will be a short period with no response during the system switching process (shown as the delay between receiving the system switching instruction and displaying the switching animation, the second system wakes up and completes the drawing and displaying of the second user interface within the delay), which affects the user experience. In the embodiment of the present disclosure, in order to reduce the display delay of the second user interface during the system switching process, when the system switching instruction to switch to the second system is received during the operation of the first system, the first system draws and displays the second user interface of the second system (only responsible for drawing an interface image, without performing any specific function of the second system in the first system, e.g., the second user interface displays application icons, the first system only displays the application icons, but the application icons do not have the function of launching the applications).

In some embodiments, the system switching instruction may be an instruction triggered by a shortcut key (such as a physical button provided on the wearable device), or an instruction triggered by sliding (such as sliding the display interface of the wearable device with one or two fingers), or an instruction triggered by clicking (for example, by clicking or double-clicking the display interface of the wearable device). The second user interface may display icons such as sports and health, instant messaging, alarm clock, weather, and voice assistant, and the displayed second user interface may be a static interface or a dynamic interface. The embodiment of the present disclosure is not limited to any specific triggering schemes of the system switching instruction and any specific content displayed on the second user interface.

Since the first system is in the awake state, the first system can draw and display the second user interface immediately after receiving the system switching instruction, thereby visually improving the system switching speed.

In a possible implementation, in order to achieve smooth switching between the interfaces, after the first system draws the second user interface, it gradually replaces the first user interface by means of sliding display until the second user interface is completely displayed. In some embodiments, the second user interface may be displayed in a rotating or splitting manner, and the embodiment of the present disclosure is not limited to any specific display manner of the second user interface.

Figures 4, 5:
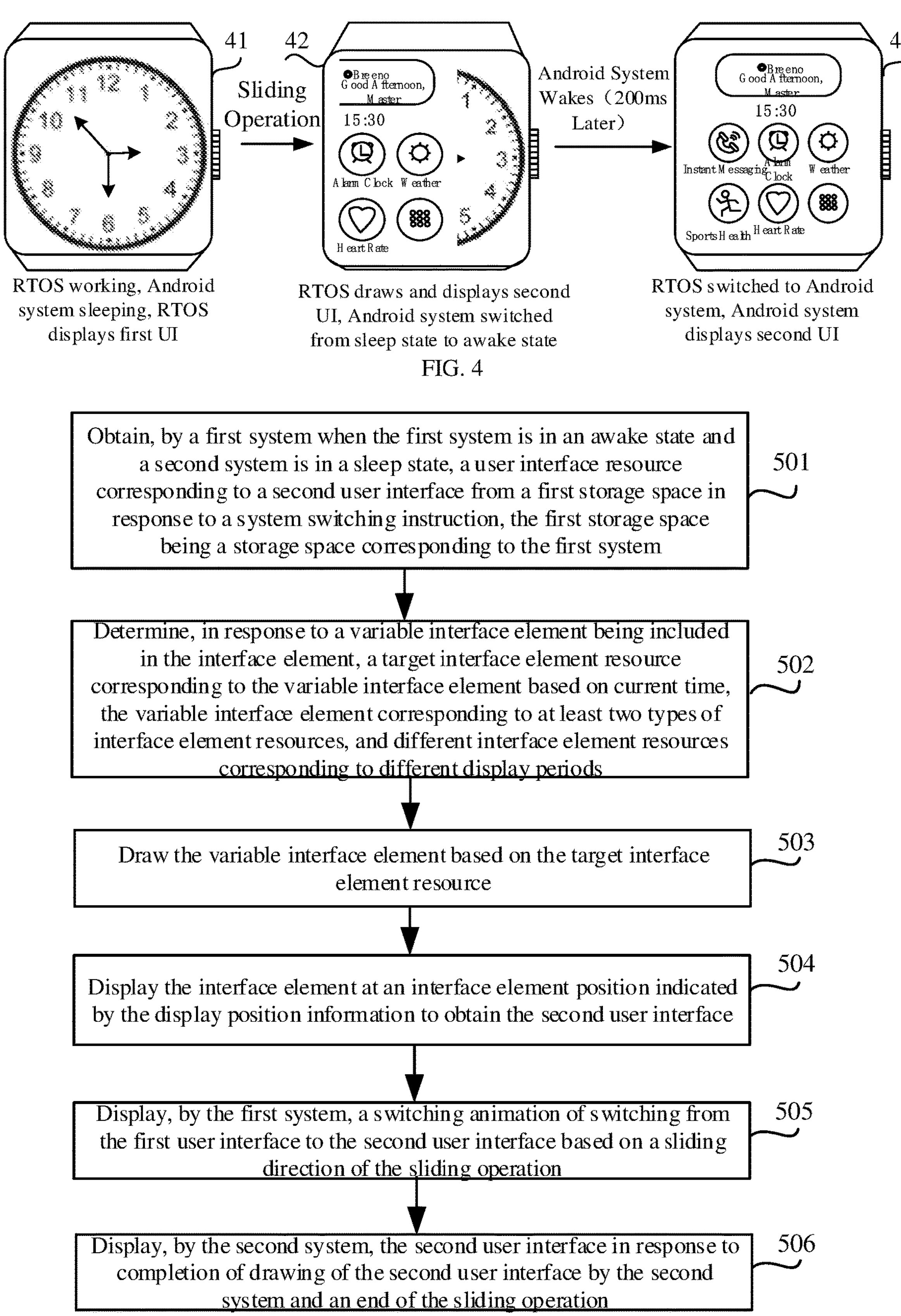
FIG. 4 is a schematic diagram showing user interfaces in a system switching process of a smart watch according to an exemplary embodiment of the present disclosure.
FIG. 5 shows a flowchart illustrating a user interface display method according to another exemplary embodiment of the present disclosure.

Schematically, as shown in FIG. 4, taking a smart watch as an example of the wearable device, the smart watch is provided with an RTOS (run by the first processor) and an Android system (run by the second processor). When the first processor is in the awake state and the second processor is in the sleep state, the smart watch displays the first user interface 41 using the RTOS, and the Android system is in the sleep state, thereby maintaining lower power consumption. When the user needs to switch from the RTOS to the Android system, the system switching instruction can be triggered by a sliding operation. Correspondingly, after receiving the system switching instruction, the RTOS draws and displays the second user interface 42 of the Android system.

At Step 303, the second user interface is displayed by the second system in response to completion of drawing of the second user interface by the second system.

After the second system completes drawing of the second user interface, the system running on the wearable device is switched from the first system to the second system, such that the second system can display the second user interface and perform corresponding functions. For example, when the user needs to use a call function, the user enters a communication interface by triggering an instant messaging application on the second user interface. Since the second user interfaces drawn and displayed by the first system and the second system are consistent, there is no problem of sudden changes in the screen before and after system switching, thereby making the system switching process difficult to be noticed.

In some embodiments, after switching to the second system, the first system may still be in the awake state (low power consumption, less impact on the battery life), or the first system may be switched to be in the sleep state, and the embodiment is not limited to this.

In a possible implementation, in order to ensure that the system can be switched to the second system in time after the first system draws and completely displays the second user interface, so as to avoid the case where the user clicks an icon after the first system completely displays the second user interface and there is no response (the second user interface is drawn and displayed by the first system at this time), a sliding speed of the second user interface can be determined according to the time when the second system wakes up and draws the second user interface, so as to ensure that when the second user interface drawn by the first user completely occupies the display interface of the wearable device, the second system has already drawn the second user interface to achieve system switching without the user's perception.

Schematically, as shown in FIG. 4, when the RTOS displays the second user interface 42, the second user interface 42 is displayed by means of sliding display from left to right until the first user interface 41 is completely switched to the second user interface 42. During the process of the second user interface 42 being displayed by means of sliding display from left to right, the Android system switches from the sleep state to the awake state. When the Android system wakes up and completes drawing (for example, after 200 ms), the system running on the smart watch is switched from the RTOS to the Android system, and the Android system displays the second user interface 43.

In some embodiments, after the second system completes processing of an event (such as returning to the watch face after a call ends), the second system switches back to the sleep state and the first system continues to process events, such that the wearable device maintains high performance (but high power consumption) in a few scenarios, while maintaining low power consumption (but low performance) in most scenarios, thereby further reducing the power consumption of the wearable device and extending the battery life of the wearable device.

To summarize, in the embodiment of the present disclosure, for a wearable device that supports dual systems, if a system switching instruction is received when the first system is in the working state and the second system is in the sleep state, the first system draws and displays the second user interface, and after the second system draws the second user interface, the second system displays the second user interface. With the solution according to the embodiment of the present disclosure, and the first system pre-displays the second user interface, which can improve the start-up speed of system switching visually, and reduce the display delay for the second system to display the second user interface during the system switching process.

In a possible implementation, the first system and the second system each have a data storage space, and since the first system is only responsible for processing simple events, while the second system needs to process complex events, the storage space corresponding to the second system is much larger than the storage space corresponding to the first system. In order for the first system to draw and display the second user interface, the storage space corresponding to the first system stores a user interface resource corresponding to the second user interface. Once the system switching instruction is received, the first system can draw the user interface based on the use interface resource in the storage space. In the following, exemplary embodiments will be described.

Reference is made to FIG. 5, which is a flowchart illustrating a user interface display method according to another exemplary embodiment of the present disclosure. This embodiment uses a wearable device as an example for illustration. The method may include the following steps.

At Step 501, when a first system is in an awake state and a second system is in a sleep state, in response to a system switching instruction, the first system obtains a user interface resource corresponding to a second user interface from a first storage space, the first storage space being a storage space corresponding to the first system.

In this embodiment of the present disclosure, the first system corresponds to a first storage space, and user interface resources corresponding to at least one user interface are stored in the first storage space. The user interface resource refers to resources required for drawing the user interface, including text resources, picture resources, animation resources, special effect resources, interface layout resources, etc. This embodiment is not limited to any specific content contained in the interface resources.

In a possible implementation, a user interface resource corresponding to a first user interface of the first system and the user interface resource corresponding to the second user interface of the second system are stored in the first storage space. For example, when the first user interface is a watch face, the first storage space stores a watch face resource, and when the second system is installed with a sports and health application, an alarm clock application, and an instant messaging application, the corresponding sports and health icon, alarm clock application icon, and instant messaging icon are displayed on the second user interface. Correspondingly, icon resources corresponding to the respective application icons are stored in the first storage space. In some embodiments, the second user interface may also display a desktop widget and a voice assistant, and correspondingly, corresponding user interface resources are also stored in the first storage space.

In some embodiments, based on the interface element to be drawn, the first system searches the first storage space for an interface element resource corresponding to the interface element.

In an illustrative example, a mapping relationship between interface elements and interface element resources in the first storage space is shown in Table 1.

TABLE 1

| Interface Element | Interface Element Resource |
|---|---|
| Instant Messaging Icon | Interface Element Resource A |
| Alarm Clock Icon | Interface Element Resource B |
| Weather Icon | Interface Element Resource C |
| Sports and Health Icon | Interface Element Resource D |

As shown in Table 1, when the icon of the instant messaging application is displayed on the second user interface, the first system acquires the interface element resource A corresponding to the interface element "instant messaging icon" from the first storage space.

At Step 502, in response to a variable interface element being included in the interface element, a target interface element resource corresponding to the variable interface element is determined based on current time. The variable interface element corresponds to at least two types of interface element resources, and each interface element resource correspond to a different display period.

When obtaining interface element resources based on interface elements, in addition to determining fixed interface elements among the interface elements (for example, the icons of the alarm clock application and the instant messaging application are both fixed interface elements), it is also necessary to determine variable interface elements (such as the time display widgets and greetings are variable interface elements).

Here, the variable interface elements may have different forms in different time periods. That is, the variable interface elements may correspond to a plurality of interface element resources, and thus when drawing variable interface elements, the first system also needs to use other data, such as time data, sensor data (such as pedometer data), etc., so as to ensure the accuracy and consistency of the interface elements in the drawn second user interface, and avoid differences between the interface elements drawn by the first system and the second system, which would otherwise cause a problem that the user interface changes suddenly when the system is switched.

In a possible implementation, when the interface element to be drawn includes a variable interface element, the first system determines the target interface element resource from at least two interface element resources corresponding to the variable interface element based on the current time. Here, different interface element resources correspond to different display periods, and the display period to which the current time belongs is the display period corresponding to the target interface element resource.

For example, the variable interface element is a greeting, and the interface element corresponding to the period from 0:00 to 12:00 is "Good Morning", the interface element corresponding to the period from 12:00 to 17:00 is "Good Afternoon", and the interface element corresponding to the time period "17:00 to 24:00" is "Good Evening".

Schematically, when the second user interface to be drawn contains a greeting (the greeting is displayed as a text message such as Good Morning, Good Afternoon, and Good Evening on the user interface according to the time period), if the current time is ten o'clock, the first system determines the interface element resource "Good Morning" corresponding to the time period of the current moment as the target greeting.

At Step 503, the variable interface element is drawn based on the target interface element resource.

Further, after obtaining the corresponding interface resource, the first system draws the corresponding interface element according to the determined target interface resource.

In an illustrative example, the first system obtains interface resources that include picture resources corresponding to application icons and text resources corresponding to greetings, thereby rendering application icons based on the picture resources and rendering greetings based on the text resources.

At Step 504, the interface element is displayed at an interface element position indicated by the display position information to obtain the second user interface.

The first system determines the arrangement and layout of each interface element in the second user interface according to the position information of the interface elements included in the user interface resource, and displays the second user interface.

In a possible implementation, as shown in FIG. 6, a voice assistant 610 is displayed in an upper part of the second user interface 600, and a greeting 611 is displayed in the voice assistant 610, and the greeting 611 is displayed as different text information according to the current time period. Application icons such as an instant messaging icon 620, an alarm clock icon 630, and a sports and health icon 640 are displayed in a lower part of the second user interface 600. It should be noted that, at this time, the second user interface 600 is drawn and displayed by the first system, and the displayed interface elements do not have corresponding functions. That is, when the user clicks the instant messaging icon 620, there will be no response and no communication interface will be displayed.

At Step 505, the first system displays a switching animation of switching from the first user interface to the second user interface based on a sliding direction of the sliding operation.

After the first system draws the second user interface, based on the sliding direction of the sliding operation, the first user interface is switched to the second user interface by means of sliding. Here, the sliding direction of the sliding operation is set by the user in the second system, e.g., including switching animations such as left-right switching, fly-in, and split.

Schematically, as shown in FIG. 4, the second user interface 402 drawn by the first system is switched by means of left-right switching. It should be noted that this embodiment is not limited to any specific switching animation of the user interface.

At Step 506, in response to completion of drawing of the second user interface by the second system and an end of the sliding operation, the second system displays the second user interface.

When the sliding of the second user interface ends, that is, when the first user interface is switched to the second user interface, the second system has been woken and has drawn all the interface elements contained in the second user interface. When the first system is switched to the second user interface, the second system displays the second user interface. Since the interface elements contained in the second user interface are the same before and after the system switching, the system switching has been done without the user's perception.

In order to ensure that the interface display of the wearable device is controlled by the second system after the system switching is completed, after the second system draws the second user interface, it obtains the control permission of interface display by transmitting a switching instruction to the first system, and after the second system obtains the control permission, the display interface of the wearable device will be controlled by the second system, and the first system can enter the sleep state or an off state.

In some embodiments, in response to completion of drawing of the second user interface by the second system, the wearable device may transmit a switching instruction to the first system using the second system, and the switching instruction is used to instruct the first system to transfer a permission for Graphical User Interface (GUI) display.

In order to ensure the normal use of the second user interface, during the system switching process, the first system needs to transfer the permission of GUI display to the second system, such that the second system can display the graphical user interface of the second system on the wearable device during normal operation. In a possible implementation, after the second system completes drawing of the second user interface, it transmits a switching instruction to the first system, instructing the first system to transfer the permission for graphical user interface display to the second system.

In response to obtaining the permission for graphical user interface display by the second system, the wearable device displays the second user interface using the second system.

After the second system obtains the permission for graphical user interface display, the wearable device will switch from the first system to the second system, and display the second user interface using the second system. In the second user interface displayed by the second system, the displayed interface elements have corresponding functions, e.g., by clicking the instant messaging icon, the communication interface can be entered.

In this embodiment, by storing the user interface resource corresponding to the second user interface in the first storage space, after the first system receives the system switching instruction, it can obtain the corresponding target interface element resource accurately from the first storage space based on the variable interface element and the fixed interface element contained in the second user interface, and further display the interface element on the second user interface based on the display position information, thereby improving the drawing speed and display accuracy of the second user interface.

In addition, with the first system pre-displaying the second user interface, the start-up speed of the system switching can be increased visually, and the display delay for the second system to display the second user interface during the system switching process can be reduced.

In addition, after the second system completes drawing of the second user interface, it obtains the permission for graphical user interface display by transmitting a switching instruction to the first system, so as to ensure that the second system displays the graphical user interface on the wearable device during normal operation.

In the above embodiments, since the second user interface of the second system in the wearable device does not remain unchanged, e.g., the order of interface elements in the second user interface may be changed, the interface elements displayed on the second user interface may be added or deleted, etc., in order to ensure accurate display of the second user interface after the system switching, the user interface resources stored in the first storage space also need to be updated accordingly. In a possible implementation, when the second system is in the awake state or is restarted, the second system automatically transmits interface resource update data to the first system (when there is an interface resource update event), the first system updates the user interface resources stored in the first storage space based on the interface resource update data. Here, the user interface resource update data at least includes an interface element resource corresponding to an interface element to be updated.

Referring to FIG. 7, which is a flowchart illustrating a user interface resource update process according to an exemplary embodiment of the present disclosure, the method may include the following steps.

At Step 701, when the second system is in the awake state, the second system transmits interface resource update data to the first system, the interface resource update data having a data format agreed between the first system and the second system.

In a possible implementation, while the second system is in the awake state, when the second system detects an interface resource change event, it transmits the interface resource update data to the first system via a data link connecting the first system and the second system. The interface resource change event includes at least one of an interface element addition or deletion event, an interface element position adjustment event, or a system setting change event. The system setting change event includes system language change, system text font change, system text font size change, system style change, etc., and this embodiment is not limited to any of these examples.

In another possible implementation, every time the second system is restarted, it needs to transmits the interface resource update data to the first system, so as to ensure the consistency of the interface resources corresponding to the second user interface in the first system and the second system.

In some embodiments, when the second system determines that an interface resource change event occurs, it encodes the interface resource update data corresponding to the second user interface into a byte stream according to an agreed protocol, and packetizes and transmits the byte stream to the first system via a data link. The interface resource update data has a data format agreed between the first system and the second system.

In an exemplary example, the format of the data transmitted by the second system to the first system may be as follows.

```
message SendRequest { //Number of data packets
uint32 size = 0 × 01;
```

-continued

```
}
message SendResponse { //Send response
uint32 ack = 0 × 01;
message Icons { //Define icon bytes
bytes icon = 0 × 01;
}
message Greetings { //Send greeting information
uint32 startTime = 0 × 01; //Define start time
uint32 endTime = 0 × 02; //Define end time
string greeting = 0 × 03; //Greeting content
}
message AllData { //Send interface resource information
repeated Greetings greetings = 0 × 01;
repeated Icons icons = 0 × 02;
}
message Suggestion { //Send update suggestion information
string suggestion = 0 × 01;
}
```

After the first system receives the data packets transmitted by the second system, it decodes the data packets according to the protocol agreed with the second system, and obtains the user interface resource corresponding to the updated second user interface.

At Step 702, the first system updates the user interface resource stored in the first storage space based on the interface resource update data.

After receiving the interface resource update data, the first system will store the updated interface element and the updated interface element resource in association with each other. During the subsequent system switching process, the first system can draw and display the second user interface based on the updated interface element resource, so as to ensure that the displayed second user interface is consistent with the user interface of the second system.

With reference to the example of the above steps, after the first system updates the interface element resources based on the received data packets, the mapping relationship between the interface elements and the interface element resources in the first storage space is shown in Table 2.

TABLE 2

| Interface Element | Interface Element Resource |
|---|---|
| Instant Messaging Icon | Interface Element Resource A' |
| Alarm Clock Icon | Interface Element Resource B' |
| Weather Icon | Interface Element Resource C |
| Sports and Health Icon | Interface Element Resource D |

As shown in Table 2, referring to the examples in the above steps, the interface element resource A and interface element resource B corresponding to the instant messaging icon and the alarm clock icon are updated, and the first system obtains the updated interface element resource A' and interface element resource B' based on the received interface resource update data.

Taking language update as an example, when the display language of the second user interface is updated from Chinese to English, the Chinese text information in the interface element resource is updated to English text information.

Schematically, as shown in FIG. 8, when the RTOS is in the working state, the first user interface 81 is displayed. When system switching is required, the system switching is performed with a sliding operation, and the first system draws and displays the second user interface 82 based on the updated user interface resource. The interface elements displayed in the second user interface 82 are updated from the Chinese state to the English state.

In some embodiments, after the update of the user interface resource is completed, the first system transmits an update completion notification to the second system, informing the second system that the update of the user interface resource has been completed. If the second system does not receive the update completion notification within a predetermined time period, it retransmits the update data packets to the first system.

In another possible implementation, the data packets updated by the second system to the first system may include interface element resources corresponding to all interface elements in the second user interface. Correspondingly, when the system language of the wearable device changes, most of the user interface resources stored in the first storage space may have been invalid. Therefore, in order to release the first storage space and ensure the accuracy of subsequent user interface resource updates, when receiving the update data packets of the first system, the first system may delete the user interface resources in the first storage space, directly decode the received update data packets, and obtain the user interface resources corresponding to the updated second user interface packets.

Figures 9, 10, 11:
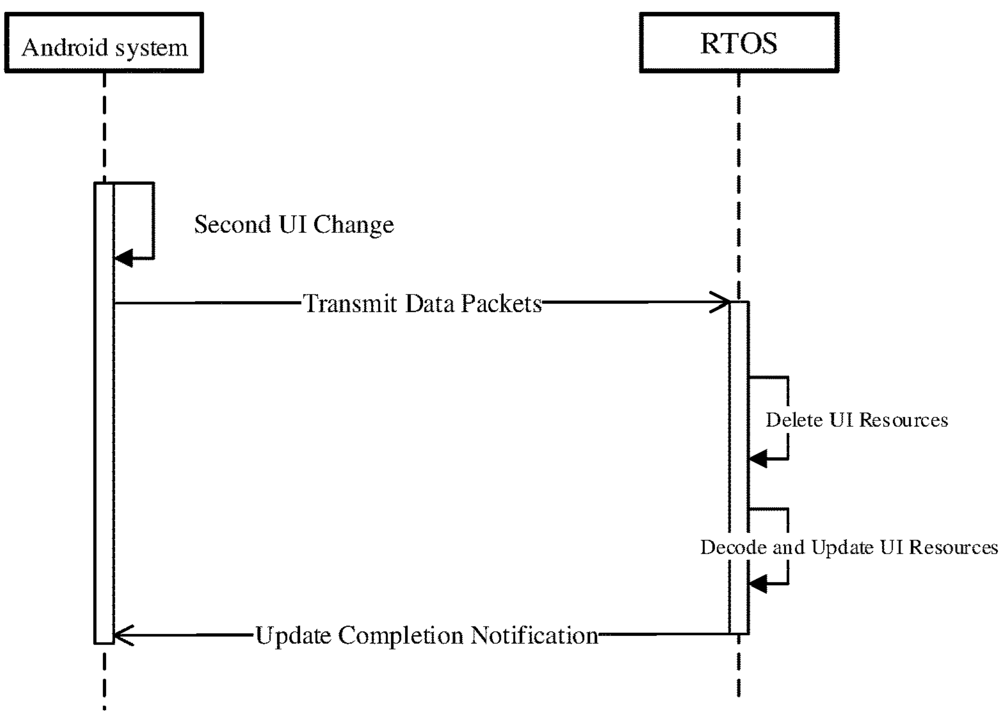
FIG. 9 is a timing sequence diagram showing system interaction in a user interface resource update process according to an exemplary embodiment of the present disclosure.
FIG. 10 shows a block diagram showing a structure of a user interface display apparatus according to another embodiment of the present disclosure.
FIG. 11 shows a block diagram showing a structure of a wearable device according to an exemplary embodiment of the present disclosure.

Schematically, as shown in FIG. 9, taking the first system as an RTOS and the second system as an Android system as an example, when the second user interface changes and a system setting change event is determined to have occurred, the Android system transmits update data packets to the RTOS, the update data packets containing the user interface resources corresponding to the updated second user interface. When the RTOS receives the data packets, it determines that the second user interface has changed, and deletes the user interface resources contained in the first storage space, decodes the received data packets, obtains the updated user interface resources and stores them in the first storage space. In some embodiments, after the RTOS is updated, an update completion notification may be transmitted to the Android system.

In this embodiment, when the user interface resources are updated, the second system transmits the updated user interface resources to the first system by confirming the interface resource change event, and the first system updates the user interface resources stored in the first storage space, to ensure that the second user interface displayed by the first system is consistent with the second user interface displayed by the second system in subsequent system switching, so as to achieve switching without the user's perception.

It should be noted that, in each of the above embodiments, only the display process of the user interface in a dual-core dual-system device is used as an example for illustration. In other possible application scenarios, single-core dual-system devices (such as different systems running on different cores of a processor) can also use the solution according to the embodiment of the present disclosure for displaying the user interface during the system switching process, and details thereof will be omitted here.

Referring to FIG. 10, which is a block diagram showing a structure of a user interface display apparatus according to an embodiment of the present disclosure, the apparatus can be implemented as all or a part of a wearable device in software, hardware or a combination thereof. The apparatus includes:

a first system module 1001 configured to display, by the first system when the first system is in an awake state and the second system is in a sleep state, a first user interface;

the first system module 1001 being further configured to draw and display, by the first system, a second user interface in response to a system switching instruction, the second user interface being a user interface of the second system; and a second system module 1002 configured to display, by the second system, the second user interface in response to completion of drawing of the second user interface by the second system.

In some embodiments, the first system module 1001 may be configured to:

obtain, by the first system in response to the system switching instruction, a user interface resource corresponding to the second user interface from a first storage space, the first storage space being a storage space corresponding to the first system;

draw, by the first system, the second user interface based on the user interface resource; and display, by the first system, the second user interface.

In some embodiments, the user interface resource may include an interface element resource and display position information corresponding to an interface element.

In some embodiments, the first system module 1001 may be configured to:

draw the interface element based on the interface element resource; and display the interface element at an interface element position indicated by the display position information to obtain the second user interface.

In some embodiments, the first system module 1001 may be configured to:

determine, in response to a variable interface element being included in the interface element, a target interface element resource corresponding to the variable interface element based on current time, the variable interface element corresponding to at least two types of interface element resources, each corresponding to a different display period; and draw the variable interface element based on the target interface element resource.

In some embodiments, the system switching instruction may be triggered by a sliding operation.

In some embodiments, the first system module 1001 may be configured to:

display, by the first system, a switching animation of switching from the first user interface to the second user interface based on a sliding direction of the sliding operation.

In some embodiments, the second system module 1002 may be configured to:

display, by the second system, the second user interface in response to completion of drawing of the second user interface by the second system and an end of the sliding operation.

In some embodiments, the second system module 1002 may be further configured to:

transmit, by the second system when the second system is in the awake state, interface resource update data to the first system, the interface resource update data having a data format agreed between the first system and the second system; or transmit, by the second system, interface resource update data to the first system after the second system restarts; and update, by the first system, the user interface resource stored in the first storage space based on the interface resource update data.

In some embodiments, the second system module 1002 may be further configured to:

transmit, by the second system when the second system is in the awake state, the interface resource update data to the first system in response to an interface resource change event, the interface resource change event comprising at least one of an interface element addition or deletion event, an interface element position adjustment event, or a system setting change event.

In some embodiments, the second system module 1002 may be further configured to:

transmit, by the second system, a switching instruction to the first system, the switching instruction being used to instruct the first system to transfer a permission for graphical user interface display; and display, by the second system, the second user interface in response to the second system obtaining the permission for graphical user interface display.

In some embodiments, the wearable device may be provided with a first processor and a second processor, the second processor having higher power consumption than the first processor, the first system being a system run by the first processor, and the second system being a system run by the second processor.

To summarize, in the embodiment of the present disclosure, for a wearable device that supports dual systems, if a system switching instruction is received when the first system is in the working state and the second system is in the sleep state, the first system draws and displays the second user interface, and after the second system draws the second user interface, the second system displays the second user interface. With the solution according to the embodiment of the present disclosure, and the first system pre-displays the second user interface, which can improve the start-up speed of system switching visually, and reduce the display delay for the second system to display the second user interface during the system switching process.

In this embodiment, by storing the user interface resource corresponding to the second user interface in the first storage space, after the first system receives the system switching instruction, it can obtain the corresponding target interface element resource accurately from the first storage space based on the variable interface element and fixed interface element contained in the second user interface, and further display the interface element on the second user interface based on the display position information, thereby improving the drawing speed and display accuracy of the second user interface.

In addition, with the first system pre-displaying the second user interface, the start-up speed of the system switching can be increased visually, and the display delay for the second system to display the second user interface during the system switching process can be reduced.

In addition, after the second system completes drawing of the second user interface, it obtains the permission for graphical user interface display by transmitting a switching instruction to the first system, so as to ensure that the second system displays the graphical user interface on the wearable device during normal operation.

In this embodiment, when the user interface resources are updated, the second system transmits the updated user interface resources to the first system by confirming the interface resource change event, and the first system updates the user interface resources stored in the first storage space, to ensure that the second user interface displayed by the first system is consistent with the second user interface displayed by the second system in subsequent system switching, so as to achieve switching without the user's perception.

Referring to FIG. 11, which is a block diagram showing a structure of a wearable device according to an exemplary embodiment of the present disclosure, the wearable device in the present disclosure may include one or more of the following components: a processor 1110 and a memory 1120.

The processor 1110 includes at least a first processor 1111 and a second processor 1112. The first processor 1111 is configured to run a first system, the second processor 1112 is configured to run a second system, and the first processor 1111 has lower power consumption and lower performance than the second processor 1112. The processor 1110 uses various interfaces and lines to connect various parts of the entire electronic device, and performs various functions of the electronic device and processes data by running or executing instructions, programs, code sets or instruction sets stored in the memory 1120 and invoking data stored in the memory 1120. In some embodiments, the processor 1110 may be implemented in the form of hardware using at least one of a Digital Signal Processor (DSP), a Field-Programmable Gate Array (FPGA), or a Programmable Logic Array (PLA). The processor 1111 may integrate one or more of a Central Processing Unit (CPU), a Graphics Processing Unit (GPU), a Neural-network Processing Unit (NPU) and a modem, or any combination thereof. Here, the CPU mainly handles the operating system, user interface and application programs, etc. The GPU is configured to render and draw the content that needs to be displayed on the touch screen. The NPU is configured to provide the function of Artificial Intelligence (AI). The modem is configured to handle wireless communication. It can be understood that, the above modem may not be integrated into the processor 1110, but may be provided as a separate chip.

The memory 1120 may include a Random Access Memory (RAM), and may include a Read-Only Memory (ROM). In some embodiments, the memory 1120 includes a non-transitory computer-readable storage medium. The memory 1120 may store instructions, programs, codes, code sets, or instruction sets. The memory 1120 may include a program storage area and a data storage area. The program storage area may store instructions for implementing an operating system, instructions for at least one function (such as a touch function, a sound playback function, an image playback function, etc.), instructions for implementing the method embodiments, and the like. The storage data area can store data created according to the use of the wearable device (such as audio data, phonebook) and the like.

The wearable device in the embodiment of the present disclosure further includes a communication component 1130 and a display component 1140. Here, the communication component 1130 may be a Bluetooth component, a WiFi component, a Near Field Communication (NFC) component, etc., and may be configured to communicate with external devices (servers or other terminal devices) via a wired or wireless network. The display component 1140 is configured to display a graphical user interface, and/or receive user interaction operations.

In addition, it can be appreciated by those skilled in the art that the structure of the wearable device shown in the above figure does not constitute a limitation on the wearable device, and the wearable device may include more or less components, or combinations of certain components, or different arrangements of components. For example, the wearable device may further include components such as a radio frequency circuit, an input unit, a sensor, an audio circuit, a speaker, a microphone, and a power supply, and details thereof will be omitted here.

An embodiment of the present disclosure provides a computer-readable storage medium. The computer-readable storage medium stores at least one instruction which, when executed by a processor, implements the user interface display method according to the above embodiment. An embodiment of the present disclosure provides a computer program product or computer program. The computer program product or computer program includes computer instructions stored in a computer-readable storage medium. The computer instructions, when read from the computer-readable storage medium and executed by a processor, cause the computer device to implement the user interface display method according to the above embodiment.

It can be appreciated by those skilled in the art that, in one or more of the above examples, the functions described in the embodiments of the present disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium. The communication medium includes any medium that facilitates transfer of a computer program from one place to another. The storage medium can be any available medium that can be accessed by a general purpose or special purpose computer.

While the optional embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A user interface display method, applied in a wearable device that supports running of a first system and a second system, the method comprising:

displaying, by the first system when the first system is in an awake state and the second system is in a sleep state, a first user interface;

drawing and displaying, by the first system, a second user interface in response to a system switching instruction, the second user interface being a user interface of the second system; and displaying, by the second system, the second user interface in response to completion of drawing of the second user interface by the second system;

wherein said drawing and displaying, by the first system, the second user interface in response to the system switching instruction comprises:

obtaining, by the first system in response to the system switching instruction, a user interface resource corresponding to the second user interface from a first storage space, the first storage space being a storage space corresponding to the first system;

drawing, by the first system, the second user interface based on the user interface resource; and displaying, by the first system, the second user interface.

2. The method according to claim 1, wherein the user interface resource comprises an interface element resource and display position information corresponding to an interface element, and said drawing, by the first system, the second user interface based on the user interface resource comprises:

drawing the interface element based on the interface element resource; and displaying the interface element at an interface element position indicated by the display position information to obtain the second user interface.

3. The method according to claim 2, wherein said drawing the interface element based on the interface element resource comprises:

determining, in response to a variable interface element being included in the interface element, a target interface element resource corresponding to the variable interface element based on current time, the variable interface element corresponding to at least two types of interface element resources, each corresponding to a different display period; and drawing the variable interface element based on the target interface element resource.

4. The method according to claim 1, wherein the system switching instruction is triggered by a sliding operation, and said displaying, by the first system, the second user interface comprises:

displaying, by the first system, a switching animation of switching from the first user interface to the second user interface based on a sliding direction of the sliding operation, and said displaying, by the second system, the second user interface in response to completion of drawing of the second user interface by the second system comprises:

displaying, by the second system, the second user interface in response to completion of drawing of the second user interface by the second system and an end of the sliding operation.

5. The method according to claim 1, further comprising:

transmitting, by the second system when the second system is in the awake state, interface resource update data to the first system, the interface resource update data having a data format agreed between the first system and the second system; or transmitting, by the second system, interface resource update data to the first system after the second system restarts; and updating, by the first system, the user interface resource stored in the first storage space based on the interface resource update data.

6. The method according to claim 5, wherein said transmitting, by the second system when the second system is in the awake state, the interface resource update data to the first system comprises:

transmitting, by the second system when the second system is in the awake state, the interface resource update data to the first system in response to an interface resource change event, the interface resource change event comprising at least one of an interface element addition or deletion event, an interface element position adjustment event, or a system setting change event.

7. The method according to claim 1, wherein said displaying, by the second system, the second user interface comprises:

transmitting, by the second system, a switching instruction to the first system, the switching instruction being used to instruct the first system to transfer a permission for graphical user interface display; and displaying, by the second system, the second user interface in response to the second system obtaining the permission for graphical user interface display.

8. The method according to claim 1, wherein the wearable device is provided with a first processor and a second processor, the second processor having higher power consumption than the first processor, the first system being a system run by the first processor, and the second system being a system run by the second processor.

9. The method according to claim 1, wherein when a target function is not available in the first user interface displayed by the first system, the system switching instruction is triggered to switch the first system to the second system.

10. The method according to claim 9, wherein the second user interface drawn by the first system is not available for executing the target function, and the second user interface drawn by the second system is available for executing the target function.

11. The method according to claim 10, wherein after the second system completes processing of a function, the second system is switched back to the sleep state.

12. The method according to claim 1, wherein prior to displaying by the second system the second user interface, the second system in the sleep state is switched to the awake state in response to the system switching instruction.

13. The method according to claim 1, wherein the system switching instruction is an instruction triggered by a shortcut key or an instruction triggered by sliding, or an instruction triggered by clicking.

14. The method according to claim 1, wherein after the second system completes drawing of the second user interface, a system running on the wearable device is switched from the first system to the second system.

15. The method according to claim 14, wherein after the system running on the wearable device is switched to the second system, the first system is still in the awake state or is switched to the sleep state.

16. A wearable device, comprising a processor and a memory, the wearable device supporting running of a first system and a second system, and the memory storing at least one instruction which, when executed by the processor, implements:

displaying, by the first system when the first system is in an awake state and the second system is in a sleep state, a first user interface;

drawing and displaying, by the first system, a second user interface in response to a system switching instruction, the second user interface being a user interface of the second system; and displaying, by the second system, the second user interface in response to completion of drawing of the second user interface by the second system;

wherein said drawing and displaying, by the first system, the second user interface in response to the system switching instruction comprises:

obtaining, by the first system in response to the system switching instruction, a user interface resource corresponding to the second user interface from a first storage space, the first storage space being a storage space corresponding to the first system;

drawing, by the first system, the second user interface based on the user interface resource; and displaying, by the first system, the second user interface.

17. A non-transitory computer-readable storage medium, storing at least one instruction which, when executed by a processor, implements:

displaying, by a first system when the first system is in an awake state and a second system is in a sleep state, a first user interface;

drawing and displaying, by the first system, a second user interface in response to a system switching instruction, the second user interface being a user interface of the second system; and displaying, by the second system, the second user interface in response to completion of drawing of the second user interface by the second system;

wherein said drawing and displaying, by the first system, the second user interface in response to the system switching instruction comprises:

obtaining, by the first system in response to the system switching instruction, a user interface resource corresponding to the second user interface from a first storage space, the first storage space being a storage space corresponding to the first system;

drawing, by the first system, the second user interface based on the user interface resource; and displaying, by the first system, the second user interface.

* * * * *